United States Patent
Sima

(10) Patent No.: US 12,474,396 B2
(45) Date of Patent: Nov. 18, 2025

(54) TEST LOGIC METHOD FOR AN INTEGRATED CIRCUIT DEVICE

(71) Applicant: EM Microelectronic-Marin S.A., Marin (CH)

(72) Inventor: Ovidiu Sima, Zurich (CH)

(73) Assignee: EM Microelectronic-Marin SA, Marin (CH)

( * ) Notice: Subject to any disclaimer, the term of this patent is extended or adjusted under 35 U.S.C. 154(b) by 163 days.

(21) Appl. No.: 18/028,270

(22) PCT Filed: Dec. 2, 2021

(86) PCT No.: PCT/EP2021/084037
§ 371 (c)(1),
(2) Date: Mar. 24, 2023

(87) PCT Pub. No.: WO2022/117756
PCT Pub. Date: Jun. 9, 2022

(65) Prior Publication Data
US 2023/0384363 A1    Nov. 30, 2023

(30) Foreign Application Priority Data

Dec. 4, 2020  (EP) .................................. 20211941

(51) Int. Cl.
G01R 31/28  (2006.01)
(52) U.S. Cl.
CPC ................. G01R 31/2851 (2013.01)
(58) Field of Classification Search
None
See application file for complete search history.

(56) References Cited

U.S. PATENT DOCUMENTS

| 2004/0117708 A1 | 6/2004 | Ellis et al. |
| 2005/0102591 A1* | 5/2005 | Matsushita ............ G01R 31/01 714/724 |
| 2018/0231609 A1 | 8/2018 | Jain et al. |
| 2019/0219635 A1 | 7/2019 | Molson |

FOREIGN PATENT DOCUMENTS

WO    95/32478 A1    11/1995

OTHER PUBLICATIONS

Written Opinion for PCT/EP2021/084037, dated Mar. 25, 2022.
International Search Report for PCT/EP2021/084037, dated Mar. 25, 2022.

* cited by examiner

Primary Examiner — Guerrier Merant
(74) Attorney, Agent, or Firm — Sughrue Mion, PLLC

(57) ABSTRACT

A test logic method (500) for an Integrated Circuit Device (100) including a main Integrated Circuit device (200) and an auxiliary Integrated Circuit device (300) having an auxiliary logical internal state (340). The method (500) includes a request (610), wherein a main configuration register (210) requests (610) testing (740) of an auxiliary logic circuit (330) via an auxiliary test logic circuit (350), testing (740), wherein the auxiliary test logic circuit (350) tests (740) the auxiliary logic circuit (330), displaying (750), wherein the auxiliary logic circuit (330) displays (750) the auxiliary logical internal state (340), and a reading (670), wherein the main configuration register (210) reads (670) the auxiliary logical internal state (340).

13 Claims, 2 Drawing Sheets

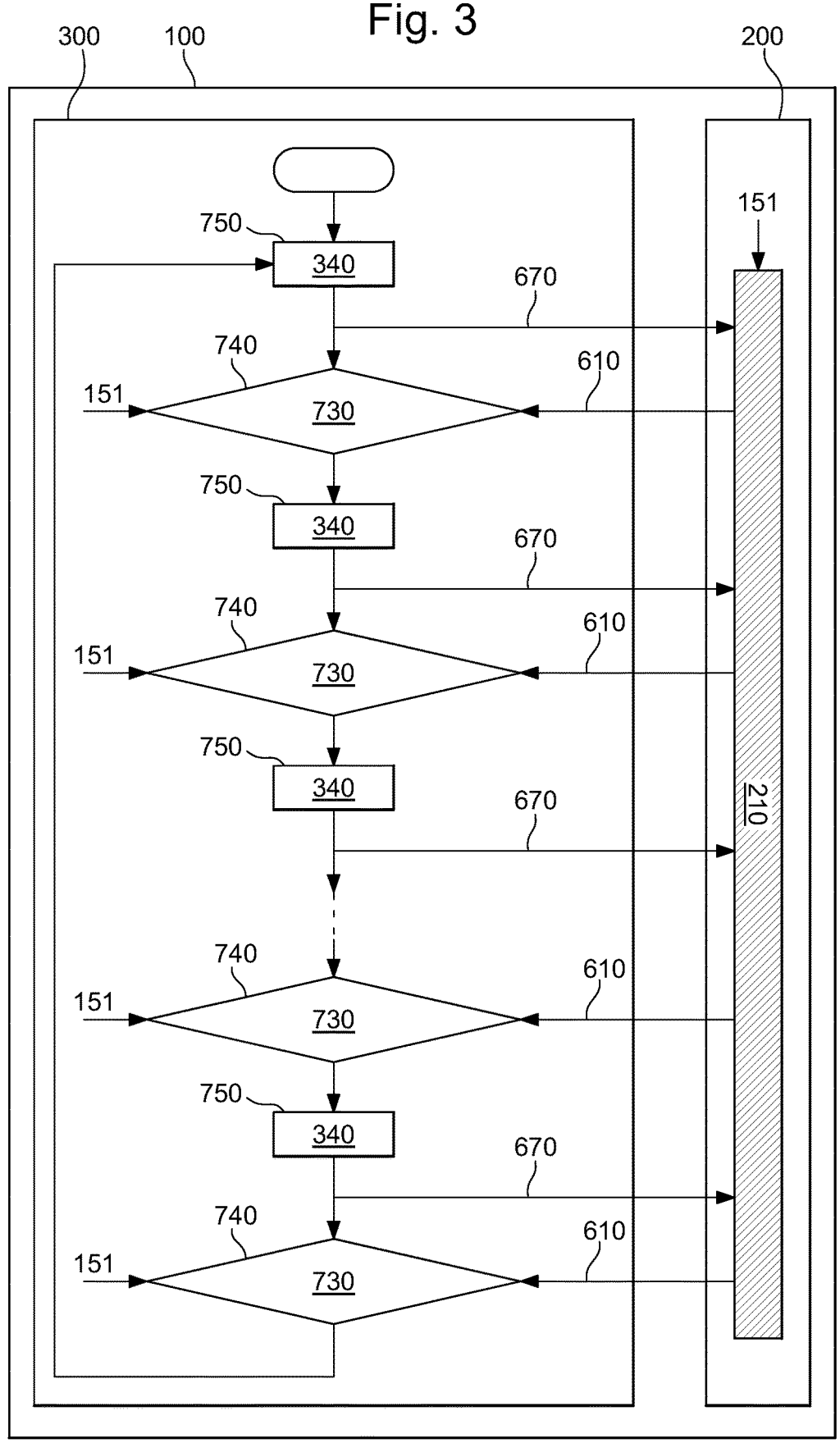

TEST LOGIC METHOD FOR AN INTEGRATED CIRCUIT DEVICE

CROSS REFERENCE TO RELATED APPLICATIONS

This application is a National Stage of International Application No. PCT/EP2021/084037 filed Dec. 2, 2021, claiming priority based on European Patent Application No. 20211941.8 filed Dec. 4, 2020.

TECHNICAL FIELD

The present invention relates to Integrated Circuit Devices with test logic circuit configured to check for defects on at least one electronic circuit.

STATE OF THE ART

Nowadays, many Integrated Circuit Devices have an embedded test logic circuit, which is used to check for fabrication defects on at least one electronic circuit.

Indeed, testability techniques have been used at least since the early days of electronic data processing equipment. Early examples are the switches and instruments that allowed an engineer to scan the voltage or current at some internal nodes in an analog computer. Testability techniques often are associated with design modifications that provide improved access to internal circuit elements such that the local internal state can be controlled, which is called controllability, and/or observed, which is called observability, more easily. The design modifications can be strictly physical in nature and/or add active circuit elements to facilitate controllability/observability. While controllability and observability improvements for internal circuit elements definitely are important for test, they are not the only type of testability techniques. Other guidelines, for example, deal with the electromechanical characteristics of the interface between the product under test and the test equipment. Examples are guidelines for the size, shape, and spacing of probe points, or the suggestion to add a high-impedance state to drivers attached to probed nets such that the risk of damage from back-driving is mitigated.

Over the years the industry has developed and used a large variety of more or less detailed and more or less formal guidelines for desired and/or mandatory testability circuit modifications. The common understanding of testability techniques in the context of Electronic Design Automation for modern microelectronics is shaped to a large extent by the capabilities of commercial testability techniques software tools as well as by the expertise and experience of a professional community of testability techniques engineers researching, developing, and using such tools. Much of the related body of testability techniques knowledge focuses on digital circuits while testability techniques for analog/mixed-signal circuits takes somewhat of a backseat.

However, there is no test logic circuit checking for states of said at least one electronic circuit.

Indeed, the introduction of new technologies, especially nanometre technologies with 14 nm or smaller geometry, has allowed Very large-scale integration, VLSI for short, rather the semiconductor industry to keep pace with increased performance-capacity demands from consumers by combining millions of MOS transistors onto a single chip.

However, smaller die sizes increase the probability of some errors. Errors in ICs are highly undesirable. For instance, Fabrication processes have become quite complicated with the advent of deep-submicron design technologies. Design elements are coming closer and closer; they are becoming smaller and thinner. Billions of transistors are involved in present-day VLSI chips. So, the chances of short circuitry are high. These are a few sources of errors or faults. As it may be construed, there can be many such errors that can creep in during the design and fabrication processes. So, with an increase in density, the probability of failure also becomes high.

Moreover, apart from fabrication, there can even be errors in the translation process due to the bugs in CAD software tools used to design the chip.

There are also several critical applications, in which it can't be afforded to have faults in the chip at any cost. For example, in medical or healthcare applications, a single fault in the equipment controllers may even risk the life of an individual. For rockets or space shuttles that run on cryogenic fuel, they may need their microcontroller or microprocessor to run on a broader temperature range. Hence the test conditions for these chips should be very application-specific and on an extreme level to prevent any future failures.

Further, In case of any future failure, for repairing or maintenance, it need to identify the proper coordinates of fault. Since PCB sizes are also decreasing, multimeter testing isn't a viable option anymore. Moreover, moving towards System on Chip design, SoC for short, the modular design is losing its relevance, thereby making the maintenance process more expensive.

The possibility of faults may arise even after fabrication during the packaging process. Therefore, it becomes vital to test every chip before it can be shipped and in fact, test it after every level of manufacturing.

The document WO 95/32478 A1 describes an integrated circuit device having a main device an auxiliary module each comprising a configuration register, but nothing is mentioned concerning the testability or observability of internal states by an auxiliary circuit.

SUMMARY OF THE INVENTION

The present invention relates to an Integrated circuit device for testing sequential circuits; said integrated circuit device comprising at least one:
  main integrated circuit device: said at least one main integrated circuit device being configured to function under at least one test mode; said at least one main integrated circuit device comprising at least one main configuration register;
  auxiliary integrated circuit device; said at least one auxiliary Integrated Circuit device being configured to function under at least one test mode and comprising at least one auxiliary configuration register, at least one auxiliary logic circuit and at least one auxiliary test logic circuit; said at least one auxiliary logic circuit is configured to cooperate with said at least one auxiliary test logic circuit and said at least one auxiliary configuration register
  said main configuration register is configured to be connected to said at least one auxiliary test logic circuit.

Thanks to this configuration, said at least one main configuration register may check for states of said at least one auxiliary Integrated Circuit device.

According to an embodiment, said at least one auxiliary test logic circuit comprises at least one auxiliary input; said at least one main configuration register is configured to carry out at least one first control controlling the state of said at least one auxiliary input in test mode.

Thanks to this configuration, said at least one main configuration register may control the state of said at least one auxiliary input in test mode.

According to an embodiment, said at least one auxiliary logic circuit comprises at least one auxiliary decision block; said at least one main configuration register is configured to carry out said at least one second control controlling the state of at least one auxiliary decision block in test mode.

Thanks to this configuration, said at least one main configuration register may control the state of at least one auxiliary decision block in test mode.

According to an embodiment, said at least one auxiliary test logic circuit is configured to test said at least one auxiliary logic circuit.

Thanks to this configuration, said at least one auxiliary test logic circuit may test said at least one auxiliary logic circuit.

According to an embodiment, said at least one auxiliary logic circuit is configured to display the state of said at least one auxiliary decision block.

Thanks to this configuration, said at least one auxiliary logic circuit may display the state of said at least one auxiliary decision block.

According to an embodiment, said at least one auxiliary decision block comprises at least one auxiliary logical internal state and said at least one main configuration register is configured to carry out at least one first observation of said at least one auxiliary logical internal state of said at least one auxiliary decision block.

Thanks to this configuration, said at least one main configuration register may observe said at least one auxiliary logical internal state of said at least one auxiliary decision block.

According to an embodiment, said at least one auxiliary test logic circuit comprises at least one auxiliary output; said at least one main configuration register is configured to carry out at least one second observation of said at least one auxiliary output.

Thanks to this configuration, said at least one main configuration register may observe said at least one auxiliary output.

According to an embodiment, said at least one auxiliary integrated circuit device comprises at least one auxiliary logical internal state; said at least one main configuration register is configured to observe the state of said at least one auxiliary logical internal state of said at least one auxiliary logic circuit via said at least one auxiliary test logic circuit in test mode.

Thanks to this configuration, said at least one main configuration register may observe the state of said at least one auxiliary logical internal state.

The present invention relates to a test logic method for an Integrated Circuit Device; said Integrated Circuit Device comprising at least one main integrated circuit device having at least one main configuration register and at least one auxiliary Integrated Circuit device having at least one auxiliary configuration register, at least one auxiliary logic circuit and at least one auxiliary test logic circuit; said at least one auxiliary logic circuit comprises at least one auxiliary decision block and said at least one auxiliary test logic circuit comprising at least one auxiliary input and at least one auxiliary output; said main test logic method comprising at least one:

control; said at least one control controls the state of said at least one auxiliary input and/or the state of at least one auxiliary decision block via said at least one main configuration register;

testing; at least one auxiliary test logic circuit tests said at least one auxiliary logic circuit;

displaying; said at least one auxiliary logic circuit displays the state of said at least one auxiliary decision block; and observation; said at least one observation observe said at least one auxiliary logical internal state and/or said at least one auxiliary output via said at least one main configuration register.

Thanks to this configuration, said at least one main configuration register may check for states of said at least one auxiliary Integrated Circuit device.

According to an embodiment, said at least one control comprises at least one first control controlling the state of said at least one auxiliary input via said at least one main configuration register.

Thanks to this configuration, the state of said at least one auxiliary input may be controlled.

According to an embodiment, said at least one control comprises at least one second control controlling the state of at least one auxiliary decision block via said at least one main configuration register.

Thanks to this configuration, the state of at least one auxiliary decision block is controlled.

According to an embodiment, said at least one observation comprises at least one first observation observing said at least one auxiliary logical internal state of said at least one auxiliary decision block via said at least one main configuration register.

Thanks to this configuration, said at least one auxiliary logical internal state is observed.

According to an embodiment, said at least one observation comprises at least one second observation observing said at least one auxiliary output of said at least one auxiliary test logic circuit via said at least one main configuration register.

Thanks to this configuration, said at least one auxiliary output of said at least one auxiliary test logic circuit is observed.

The present invention relates to a main test logic method for at least one main Integrated Circuit device of an Integrated Circuit Device; said Integrated Circuit Device comprising said at least one main Integrated Circuit device and at least one auxiliary Integrated Circuit device having at least one auxiliary logical internal state: said at least one main Integrated Circuit device comprises at least one main configuration register; said at least one auxiliary Integrated Circuit device comprises at least one auxiliary configuration register, at least one auxiliary logic circuit and at least one auxiliary test logic circuit configured to cooperate with said at least one auxiliary logic circuit; said main configuration register is configured to be connected to said at least one auxiliary test logic circuit; said main test logic method comprising at least one:

request; said at least one main configuration register requests at least one testing of said at least one auxiliary logic circuit via said at least one auxiliary test logic circuit; and reading; said at least one main configuration register reads said at least one auxiliary logical internal state.

Thanks to this configuration, said at least one main configuration register checks for states of said at least one auxiliary Integrated Circuit device.

The present invention relates to an auxiliary test logic method for at least one auxiliary Integrated Circuit device of an Integrated Circuit Device; said Integrated Circuit Device comprising at least one main Integrated Circuit device and at least one auxiliary Integrated Circuit device having at least one auxiliary logical internal state: said at least one main Integrated Circuit device comprises at least one main configuration register; said at least one auxiliary Integrated Circuit device comprises at least one auxiliary configuration register, at least one auxiliary logic circuit and at least one auxiliary test logic circuit configured to cooperate with said at least one auxiliary logic circuit; said main configuration register is configured to be connected to said at least one auxiliary test logic circuit; said main test logic method comprising at least one:

testing; said at least one auxiliary test logic circuit tests said at least one auxiliary logic circuit; and, displaying; said at least one auxiliary logic circuit displays said at least one auxiliary logical internal state.

Thanks to this configuration, said at least one auxiliary Integrated Circuit device may be checked for states of said at least one auxiliary Integrated Circuit device.

The present invention relates to a test logic method for an Integrated Circuit Device; said Integrated Circuit Device comprising at least one main Integrated Circuit device and at least one auxiliary Integrated Circuit device having at least one auxiliary logical internal state: said at least one main Integrated Circuit device comprises at least one main configuration register; said at least one auxiliary Integrated Circuit device comprises at least one auxiliary configuration register, at least one auxiliary logic circuit and at least one auxiliary test logic circuit configured to cooperate with said at least one auxiliary logic circuit; said main configuration register is configured to be connected to said at least one auxiliary test logic circuit; said main test logic method comprising at least one main test logic method according to an aspect of the present invention and at least auxiliary test logic method according an aspect of the present invention, said main test logic method comprising at least one:

request; said at least one main configuration register requests at least one testing of said at least one auxiliary logic circuit via said at least one auxiliary test logic circuit;

testing; said at least one auxiliary test logic circuit tests said at least one auxiliary logic circuit;

displaying; said at least one auxiliary logic circuit displays said at least one auxiliary logical internal state; and reading; said at least one main configuration register reads said at least one auxiliary logical internal state.

Thanks to this configuration, said at least one main Integrated Circuit device checks for states of said at least one auxiliary Integrated Circuit device.

The present invention relates to at least main Integrated Circuit device being configured to implement said main test logic method according to an aspect of the invention and comprising at least one main configuration register; said at least one main configuration register being configured to be connected to at least one auxiliary test logic circuit of at least one auxiliary Integrated Circuit device.

Thanks to this configuration, said at least one main Integrated Circuit device checks for states of said at least one auxiliary Integrated Circuit device.

The present invention relates to an auxiliary Integrated Circuit device being configured to implement said auxiliary test logic method according to an aspect of the invention and comprising at least one auxiliary configuration register, at least one auxiliary logic circuit and at least one auxiliary test logic circuit configured to cooperate with said at least one auxiliary logic circuit and to display at least one auxiliary logical internal state; said at least one auxiliary test logic circuit is configured to be connected to said main configuration register of at least one main Integrated Circuit device according to an aspect of the invention.

The present invention relates to an Integrated Circuit Device being configured to implement said test logic method according to an aspect of the invention and comprising at least one main Integrated Circuit device according to an aspect of the invention and at least one auxiliary Integrated Circuit device according to an aspect of the invention.

Thanks to this configuration, said at least one main Integrated Circuit device checks for states of said at least one auxiliary Integrated Circuit device.

BRIEF DESCRIPTION OF THE DRAWINGS

The foregoing and other purposes, features, aspects and advantages of the invention will become apparent from the following detailed description of the embodiments, given by way of illustration and not limitation with reference to the accompanying drawings, in which.

DESCRIPTION OF THE INVENTION

Figure 1:
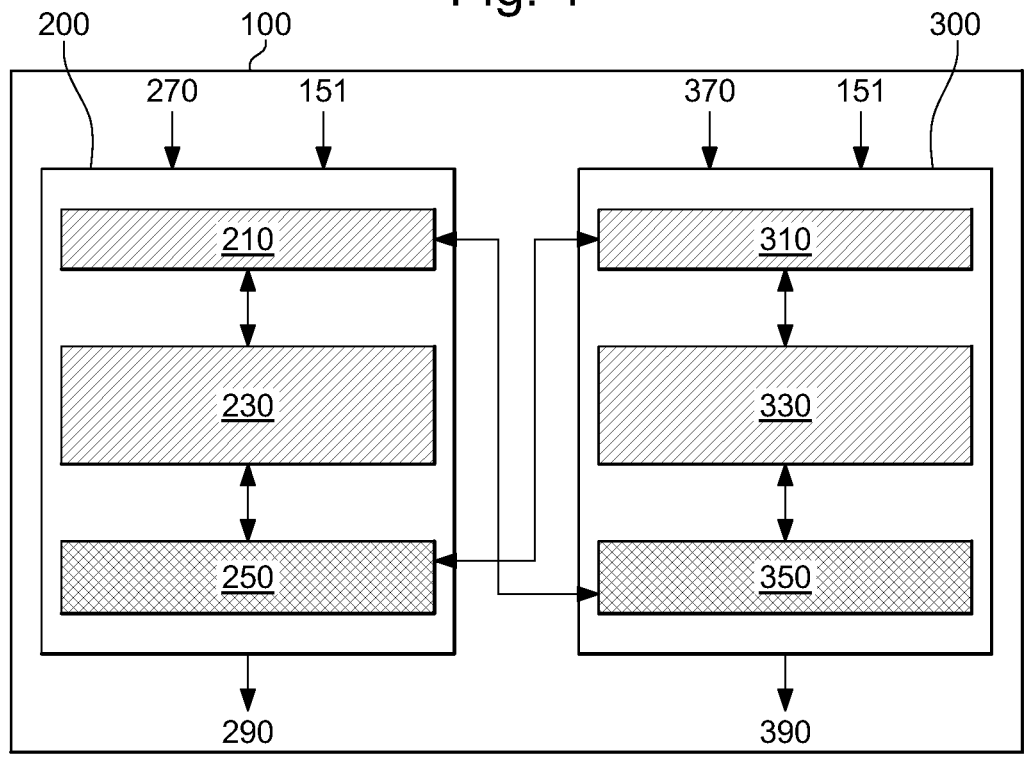
FIG. 1 represents an Integrated Circuit Device 100 comprising at least one main Integrated Circuit device 200 according to an aspect of the invention and at least one auxiliary Integrated Circuit device 300 according to an aspect of the invention.

Nowadays, many Integrated Circuit Devices may have an embedded test logic circuit. However, after checking for fabrication defects, that test logic circuit may be not used or less used.

The present invention offers a solution to the issue of testing sequential circuits. Unlike combinational circuits, it cannot determine the at least one auxiliary output of sequential circuits by merely looking into the inputs. Sequential circuits consist of finite states by virtue of flip-flops. The at least one auxiliary output also depends upon the state of the machine. It is difficult to control and observe the internal flip-flops externally. In electronics, a flip-flop or latch is a circuit that has two stable states and can be used to store state information. The circuit can be made to change state by signals applied to one or more control inputs and will have one or two at least one auxiliary outputs. It is the basic storage element in sequential logic. Flip-flops and latches are fundamental building blocks of digital electronics systems used in computers, communications, and many other types of systems. Flip-flops and latches are used as data storage elements for example. A flip-flop is a device, which stores a single bit, i.e. binary digit, of data; one of its two states represents a "one" and the other represents a "zero". Such data storage can be used for storage of state, and such a circuit is described as sequential logic in electronics. When used in a finite-state machine, the at least one auxiliary output and next state depend not only on its current input, but also on its current state and hence, previous inputs. It can also be used for counting of pulses, and for synchronizing variably-timed input signals to some reference timing signal for instance.

Hence, the state machines cannot be tested unless they are initialized to a known value. And to initialize them, a specific set of features in addition to the typical circuitry is needed. The present invention allows adding this functionality to a sequential circuit and thus testing it. Design for testing or design for testability, DFT for short, consists of IC design techniques that add testability features to a hardware product design for example. The features make it easier to develop and apply manufacturing tests to the designed hardware. The purpose of manufacturing tests is to validate that the product hardware contains no manufacturing defects that could adversely affect the product's correct functioning.

Tests are applied at several steps in the hardware manufacturing flow and, for certain products, may also be used for hardware maintenance in the customers environment. The tests are generally driven by test programs that execute using automatic test equipment or, in the case of system maintenance, inside the assembled system itself. In addition to finding and indicating the presence of defects, tests may be able to log diagnostic information about the nature of the encountered test fails. The diagnostic information can be used to locate the source of the failure. In other words, the response of vectors from a good circuit is compared with the response of vectors from a device under test. If the response is the same or matches, the circuit is good. Otherwise, the circuit is not manufactured as it was intended.

Indeed, the present invention checks the errors in the manufacturing process that are creating faults in the chips being designed. If faults can be detected earlier, then the underlying process causing the faults can be discarded at that point. This saves time and money as the faulty chips can be discarded even before they are manufactured. Another advantage of the present invention is that the method may be applied at every phase or level of abstraction from Register Transfer Logic, RTL for short, to ASIC flow. This identifies the stage when the process variables move outside acceptable values. This simplifies failure analysis by identifying the probable defect location. Meticulous monitoring improves process-line accuracy and decreases the fault occurrence probability.

More specifically, the present invention uses existing gates, like Ad-hoc techniques, such as a first peripheral testes a second peripheral and vice versa, i.e. the existing gates of second peripheral testes the first peripheral. As it may be construed, the gates are used for both purposes: controllability and observability. Indeed, a part of gates of first peripheral controls the logic of second peripheral when the chip is in test mode. In addition, the other part of gates of first peripheral observes the state of the logic of second peripheral when the chip is in test mode. The same occurs for the second peripheral.

Since the present invention does not add any new logic but uses existing logic, as early mentioned, the power consumption of the IC is maintained low.

Figure 2:
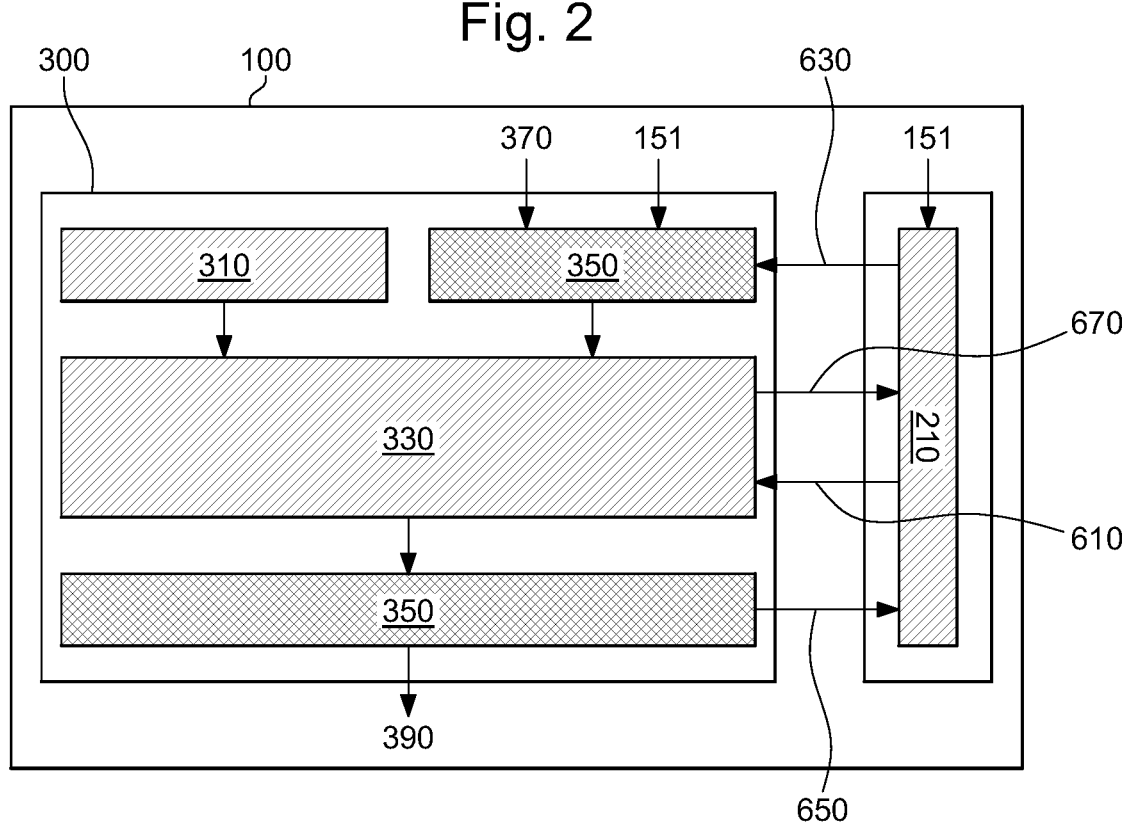
FIG. 2 represents at least one auxiliary test logic circuit 350 of said at least one auxiliary Integrated Circuit device 300 connected to said main configuration register 210 of at least one main Integrated Circuit device 200; and, FIG. 3 represents a test logic method 500 for an Integrated Circuit Device 100 according to an aspect of the invention.

Therefore, the applicant proposes an Integrated circuit device 100 for testing sequential circuits and having at least one main integrated circuit device 200 and at least one auxiliary Integrated Circuit device 300, as depicted in FIGS. 1-2.

Said at least one auxiliary Integrated Circuit device 300 may function also under at least one test mode 151 and may comprise at least one auxiliary configuration register 310, at least one auxiliary test logic circuit 350 and at least one auxiliary logic circuit 330, which may comprise at least one auxiliary decision block 730 and may cooperate, i.e. said at least one auxiliary logic circuit 330 may cooperate with said at least one auxiliary test logic circuit 350 and said at least one auxiliary configuration register 310.

On other side, said at least one main integrated circuit device 200 and may comprise at least one main configuration register 210, which may be connected to said at least one auxiliary test logic circuit 350 of said at least one auxiliary Integrated Circuit device 300. Said at least one auxiliary test logic circuit 350 may comprise at least one auxiliary input 370, at least one auxiliary output 390 and at least one test mode 151 configured to let function said at least one auxiliary Integrated Circuit device 300 be tested, in particular, said at least one main configuration register may check for states of said at least one auxiliary Integrated Circuit device thanks to a test logic method 600 partly or totally implemented by said integrated circuit device 100.

As illustrated in FIG. 3, at least one control 630, 610 of said test logic method may control the state of said at least one auxiliary input 370 and/or the state of at least one auxiliary decision block 730 via said at least one main configuration register 210. Preferably, said at least one control 630, 610 may comprise at least one first control 630 controlling the state of said at least one auxiliary input 370 via said at least one main configuration register 210, and/or at least one second control 610 controlling the state of at least one auxiliary decision block 730 via said at least one main configuration register 210, more precisely said at least one second control 610 may control the at least one auxiliary logical internal state 340 of said at least one auxiliary decision block 730 via said at least one main configuration register 210.

Said at least one control 630, 610 may be carried out by said at least one main configuration register 210, more specifically, said at least one first control 630 may be carried out by said at least one main configuration register 210 such as to control the state of said at least one auxiliary input 370 in test mode 151.

Further, said at least one main configuration register 210 may also carried out said at least one second control 610 by controlling the state of at least one auxiliary decision block 730 in test mode 151 as in FIG. 3.

Said at least one control 630, 610 may be followed by at least one testing 740, wherein said at least one auxiliary test logic circuit 350 may test 740 said at least one auxiliary logic circuit 330, and at least one displaying 750, wherein said at least one auxiliary logic circuit 330 may display 750 the state of said at least one auxiliary decision block 730.

Said at least one auxiliary logical internal state 340 and/or said at least one auxiliary output 390 may be observed 670, 650, during said at least one observation 670, 650 carried out by said at least one main configuration register 210 for example.

Preferably, said at least one observation 670, 650 may comprise at least one first observation 670 wherein said at least one auxiliary logical internal state 340 of said at least one auxiliary decision block 730 may be observed 670 via said at least one main configuration register 210, and at least one second observation 650, wherein said at least one auxiliary output 390 of said at least one auxiliary test logic circuit 350 may be observed via said at least one main configuration register 210.

Of course, one of the advantage may be that said Integrated circuit device 100 may also let test said at least one main integrated circuit device 200 by at least one auxiliary Integrated Circuit device 300.

Said at least one main Integrated Circuit device 200 may function also under at least one test mode 151 and may comprise at least one main configuration register 210, at least one main test logic circuit 250 and at least one main logic circuit 230, which may comprise at least one main decision block (not represented), and may cooperate, i.e. said at least one main logic circuit 230 may cooperate with said at least one main test logic circuit 250 and said at least one main configuration register 210, as illustrated in FIG. 1.

Said at least one auxiliary integrated circuit device 300 and may comprise at least one auxiliary configuration register 310, which may be connected to said at least one main test logic circuit 250 of said at least one main Integrated Circuit device 200. Said at least one main test logic circuit 250 may comprise at least one main input 270, at least one main output 290 and at least one test mode 151 configured to let function said at least one main Integrated Circuit device 200 be tested, in particular, said at least one auxiliary configuration register may check for states of said at least one main Integrated Circuit device thanks to a test logic method 600 partly or totally implemented by said integrated circuit device 100.

At least one control 630, 610 of said test logic method may control the state of said at least one main input 270 and/or the state of at least one main decision block (not represented) via said at least one auxiliary configuration register 310. Preferably, said at least one control 630, 610 may comprise at least one first control 630 controlling the state of said at least one main input 270 via said at least one auxiliary configuration register 310, and/or at least one second control 610 controlling the state of at least one main decision block (not represented) via said at least one auxiliary configuration register 310.

Said at least one control 630, 610 may be carried out by said at least one main configuration register 210, more specifically, said at least one first control 630 may be carried out by said at least one auxiliary configuration register 310 such as to control the state of said at least one main input 270 in test mode 151.

Further, said at least one auxiliary configuration register 310 may also carried out said at least one second control 610 by controlling the state of at least one auxiliary decision block (not represented) in test mode 151.

Said at least one control 630, 610 may be followed by at least one testing 740, wherein said at least one main test logic circuit 250 may test 740 said at least one main logic circuit 230, and at least one displaying 750, wherein said at least one main logic circuit 330 may display 750 the state of said at least one main decision block (not represented).

Said at least one main logical internal state (not represented) and/or said at least one main output 290 may be observed 670, 650, during said at least one observation 670, 650 carried out by said at least one main configuration register 210 for example.

Preferably, said at least one observation 670, 650 may comprise at least one first observation 670 wherein said at least one main logical internal state (not represented) of said at least one main decision block (not represented) may be observed 670 via said at least one auxiliary configuration register 310, and at least one second observation 650, wherein said at least one main output 290 of said at least one main test logic circuit 250 may be observed via said at least one auxiliary configuration register 310.

What is claimed is:

1. An integrated circuit device for testing sequential circuits; said integrated circuit device comprising: at least one main integrated circuit device and at least one auxiliary integrated circuit device: said at least one main integrated circuit device being configured to function under at least one test mode; and said at least one main integrated circuit device and said at least one auxiliary integrated circuit device each comprising configuration register, and wherein said at least one auxiliary integrated circuit device is configured to function under at least one test mode and comprises at least one auxiliary configuration register, at least one auxiliary logic circuit and at least one auxiliary test logic circuit, said at least one auxiliary logic circuit is configured to cooperate with said auxiliary test logic circuit and said auxiliary configuration register, and at least one main configuration register of said at least one main integrated circuit device is configured to be directly connected to said auxiliary test logic circuit of said at least one auxiliary integrated circuit device.

2. The integrated circuit device according to claim 1, wherein said at least one auxiliary test logic circuit comprising at least one auxiliary input; said at least one main configuration register is configured to carry out at least one first control controlling the state of said at least one auxiliary input in test mode.

3. The integrated circuit device according to claim 1, wherein said at least one auxiliary logic circuit comprises at least one auxiliary decision block; said at least one main configuration register is configured to carry out said at least one second control controlling the state of at least one auxiliary decision block in test mode.

4. The integrated circuit device according to claim 1, wherein said at least one auxiliary test logic circuit is configured to test said at least one auxiliary logic circuit.

5. The integrated circuit device according to claim 2, wherein said at least one auxiliary logic circuit is configured to display the state of said at least one auxiliary decision block.

6. The integrated circuit device according to claim 2, wherein said at least one auxiliary decision block comprises at least one auxiliary logical internal state and said at least one main configuration register is configured to carry out at least one first observation of said at least one auxiliary logical internal state of said at least one auxiliary decision block.

7. The integrated circuit device according to claim 1, wherein said at least one auxiliary test logic circuit comprises at least one auxiliary output; said at least one main configuration register is configured to carry out at least one second observation of said at least one auxiliary output.

8. The integrated circuit device according to claim 1, wherein said at least one auxiliary integrated circuit device comprises at least one auxiliary logical internal state; said at least one main configuration register is configured to observe the state of said at least one auxiliary logical internal state of said at least one auxiliary logic circuit via said at least one auxiliary test logic circuit (350) in test mode (151).

9. A test logic method for an integrated circuit device; said integrated circuit device comprising at least one main integrated circuit device having at least one main configuration register and at least one auxiliary integrated circuit device having at least one auxiliary configuration register, at least one auxiliary logic circuit and at least one auxiliary test logic circuit; said at least one auxiliary logic circuit comprises at least one auxiliary decision block and said at least one auxiliary test logic circuit comprising at least one auxiliary input and at least one auxiliary output; said main test logic method comprising at least one:
- control; said at least one control controls the state of said at least one auxiliary input and/or the state of at least one auxiliary decision block via said at least one main configuration register;
- testing; at least one auxiliary test logic circuit tests said at least one auxiliary logic circuit;
- displaying; said at least one auxiliary logic circuit displays the state of said at least one auxiliary decision block; and
- observation; said at least one observation observe said at least one auxiliary logical internal state and/or said at least one auxiliary output via said at least one main configuration register,
- wherein said at least one main configuration register of said at least one main integrated circuit device is directly connected to said auxiliary test logic circuit of said at least one auxiliary integrated circuit device.

10. The test logic method according to claim 9, wherein said at least one control comprises at least one first control controlling the state of said at least one auxiliary input via said at least one main configuration register.

11. The test logic method according to claim 9, wherein said at least one control comprises at least one second control controlling the state of at least one auxiliary decision block via said at least one main configuration register.

12. The test logic method according to claim 9, wherein said at least one observation comprises at least one first observation observing said at least one auxiliary logical internal state of said at least one auxiliary decision block via said at least one main configuration register.

13. The test logic method according to claim 9, wherein said at least one observation comprises at least one second observation observing said at least one auxiliary output of said at least one auxiliary test logic circuit via said at least one main configuration register.

* * * * *